United States Patent [19]
Yoshidaa et al.

[11] Patent Number: 5,461,211
[45] Date of Patent: Oct. 24, 1995

[54] GROOVE FORMING METHOD BY DISCHARGE MACHINING

[75] Inventors: Hiroshi Yoshidaa; Tadashi Kigawa; Kazuhiko Oota, all of Tokyo, Japan

[73] Assignee: Bridgestone Corporation, Tokyo, Japan

[21] Appl. No.: 215,021

[22] Filed: Mar. 21, 1994

[30] Foreign Application Priority Data

Mar. 25, 1993 [JP] Japan ................ 5-090733

[51] Int. Cl.$^6$ ............................................. B23H 1/00
[52] U.S. Cl. ......................................... 219/69.17
[58] Field of Search ................. 219/69.17, 69.14, 219/69.2, 69.16, 121.72

[56] References Cited

U.S. PATENT DOCUMENTS

| | | | |
|---|---|---|---|
| 3,609,280 | 9/1971 | Kholodnov | 219/69.17 |
| 4,169,976 | 10/1979 | Cirri | 219/121.72 |
| 4,310,742 | 1/1982 | Pfau | 219/69.17 |
| 4,365,133 | 12/1982 | Inoue | 219/69.17 |
| 4,439,660 | 3/1984 | Inoue | 219/69.17 |
| 4,441,004 | 4/1984 | Inoue | 219/69.17 |
| 4,455,469 | 6/1984 | Inoue | 219/69.17 |
| 4,459,190 | 7/1984 | Inoue | 219/69.17 |
| 5,268,550 | 12/1993 | Blocquel et al. | 219/69.17 |

FOREIGN PATENT DOCUMENTS

| | | | |
|---|---|---|---|
| 2374998 | 7/1978 | France. | |
| 2465551 | 3/1981 | France. | |
| 2484308 | 12/1981 | France. | |
| 5796730 | 6/1982 | Japan. | |
| 58-217226 | 12/1983 | Japan | 219/69.17 |
| 61-182724 | 8/1986 | Japan | 219/69.17 |
| 3-149134 | 6/1991 | Japan | 219/69.17 |

*Primary Examiner*—Goeffrey S. Evans
*Attorney, Agent, or Firm*—Sughrue, Mion, Zinn, Macpeak & Seas

[57] ABSTRACT

A method of forming a shape such as a groove by inserting a stick-like electrode during electric discharge machining to form a first deep opening, retracting the electrode, repeatedly shifting the location of the electrode and inserting the electrode while electric discharge machining to connect adjacent deep openings.

8 Claims, 1 Drawing Sheet

GROOVE FORMING METHOD BY DISCHARGE MACHINING

BACKGROUND OF THE INVENTION

1. Field of the Invention

This invention relates to method of forming a groove with a desired shape by means of electric discharge machining.

2. Description of the Prior Art

In forming a groove with a desired shape in a material by means of conventional discharge machining, after making a forming electrode having a substantially similar shape to that of the groove by performing cutting and discharge machining of an electrode material, the groove is formed by performing discharge machining by inserting the forming electrode in the material.

However, in forming a groove by means of such a conventional discharge machining, there is a problem that the operation of making the forming electrode requires much labour and time, and moreover involves high manufacturing cost, because it is required to produce the electrode with similar shape to that of the groove. Furthermore, because of the expensive cost of a forming electrode, the electrode is used repeatedly. As a result the electrode is gradually consumed, which results in causing distortion of groove dimensions.

An object of the present invention is therefore to provide a method of forming a groove by discharge machining by which it is possible to form a groove with a desired shape at low manufacturing cost and with ease and with high accuracy.

SUMMARY OF THE INVENTION

The present invention in one aspect provides a method of forming a groove by means of discharge machining, comprising carrying out discharge machining a plurality of times to form deep openings, by inserting a stick-like electrode into a material, while shifting location of the machining to connect adjacent deep openings with each other, and forming the groove having a desired shape by means of said connected deep openings.

The invention in another aspect provides a method of forming a groove by means of discharge machining, comprising carrying out discharge machining a plurality of times to form deep openings, by inserting a stick-like electrode into a material, while shifting location of the machining so as to connect adjacent deep openings with each other, and finishing a groove by shifting the stick-like electrode inserted in said connected deep openings toward a neighbouring deep opening one after another while performing discharge machining.

Firstly, by inserting a stick-like electrode into a material, discharge machining is performed to form a deep opening which has the same shape as the stick-like electrode. Next, after extracting the electrode from the material, discharge machining is performed again as described above, shifting the stick-like electrode in the lateral direction along the shape of the groove so as to connect the deep opening formed in this operation with the deep opening formed in the previous operation.

As a consequence of performing discharge machining a plurality of times by means of such a stick-like electrode, a plurality of deep openings connected to each other are produced in the material. Accordingly, by properly selecting the amount of shifting, the location and the depth of these deep openings, a groove of desired shape, that is of desired width and depth and shape of opening portion, can be formed.

In the case of forming the groove with such a desired shape, it is relatively quick and inexpensive to make said electrode because it is sufficient for a stick-like electrode to have a simple shape. Accordingly, productivity is improved and manufacturing cost is decreased as well. Moreover, if the stick-like electrode wears out as a result of repeating discharge machining, it is sufficient to replace the electrode, and therefore it is always possible to make a formed groove with high accuracy.

By forming a groove in this manner, at the boundary portions between adjacent grooves, protrusions having an approximately triangular shape are formed. As distance between the apexes of a pair of protrusions facing each other at both sides of the groove becomes width of the groove, groove width can be changed easily by means of adjusting the shifting amount between adjacent deep openings. Furthermore, in case of finishing the groove which has such protrusions as described above, for example removing the protrusions, it is sufficient to shift the stick-like electrode toward an adjacent deep opening one after another while carrying out discharge machining. Therefore, the finishing becomes simple and highly efficient.

DESCRIPTION OF THE PREFERRED EMBODIMENTS

Figure 1:
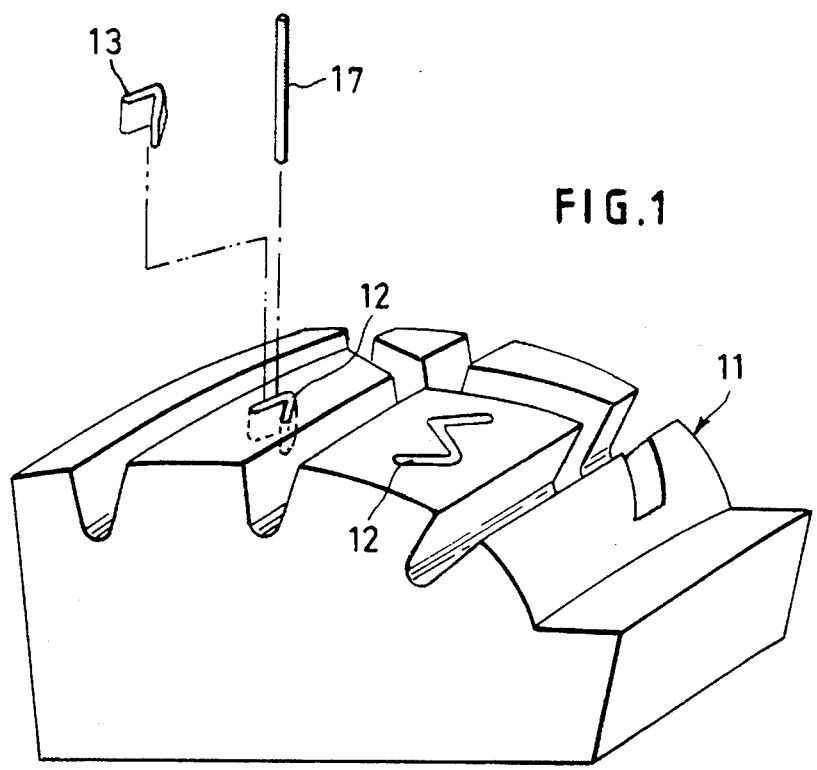
FIG. 1 is a perspective outline view showing a preferred embodiment of this invention.
Figure 2:
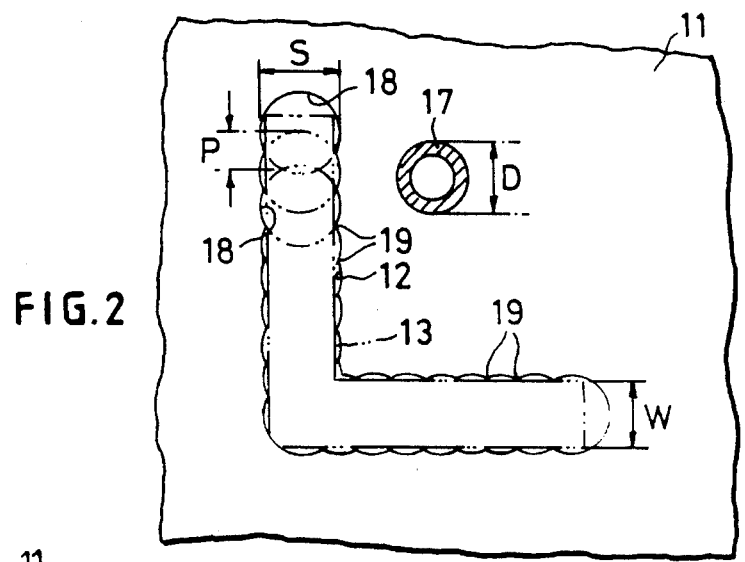
FIG. 2 is a plan view of a groove formed by means of a stick-like electrode.

In FIGS. 1 and 2, reference numeral 11 refers to a mold with high hardness as a material in which a groove is to be formed by means of the invention. In the surface of the mold 11 is formed a narrow width groove 12 with suitable sectional shape, for example a chevron figure, by discharge machining. Then, an insert 13, in this example a thin metal plate bent into a chevron figure which has the same sectional shape as the groove 12, is inserted into the groove 12.

A cylindrical and inexpensive stick-like electrode 17 is used for the electrode to perform such discharge machining, and the stick-like electrode 17 is equipped on an electrodischarge machining equipment with numerical value control (not shown in the drawings). Then, when performing discharge machining, in accordance with the discharge conditions memorized in a memory unit of the electrodischarge machining equipment, the stick-like electrode 17 is inserted into the mold 11 from the upper side shifting itself in the axial direction, and a deep opening 18 of circular section with nearly the same cross-sectional shape as the stick-like electrode, to be exact of slightly larger diameter than the electrode, is formed in the mold 11.

Since the inner diameter S of the deep opening 18 substantially corresponds to the groove width W of the groove 12, a stick-like electrode with proper diameter D selected from a plurality of kinds of stick-like electrode 17 is employed, and also the aforementioned discharge conditions are determined by appropriate values and memorized in the memory unit. Further, the shifting amount (pitch P) of the stick-like electrode 17 as explained later and the shape of the groove 12 are also memorized.

Thereinafter, when completing the formation of a deep opening 18, once the electrode 17 is extracted from the deep opening 18, then shifted as much as the prescribed pitch in the lateral direction in accordance with a signal from said memory unit, and again forming a deep opening 18 in the mold by means of the stick-like electrode 17, a deep opening 18 is formed this time to connect with the deep opening formed the previous time. Thereafter, in the same manner, shifting laterally the stick-like electrode 17 along the shape of the groove 12 as much as the prescribed pitch P according to the signal from the memory unit, discharge machining is performed a plurality of times to form the groove 12 by means of these deep openings 18 connected with each other.

A protrusion 19 of which the cross-section is an approximately triangular shape is formed in the boundary portion between adjacent deep openings 18, and the distance between the apexes of a pair of the protrusions facing each other at both sides of the groove corresponds to the groove width W of the groove 12. Since the groove width W of the groove 12 is closely related to the pitch between deep openings 18 as well, the groove width W becomes narrow as the pitch enlarges, this pitch value is calculated beforehand and memorized in the memory unit as described before. For example, in the case of forming a groove 12 of which the width W is 0.52 mm, a stick-like electrode of 0.45 mm diameter is selected and fixed to an electrodischarge machining equipment; in addition, discharge conditions are determined in such a way that the inner diameter S of a deep opening 18 formed by means of the stick-like electrode 17 amounts to 0.55 mm, and those conditions are memorized in a memory unit.

Also, the pitch P (0.18 mm) between adjacent deep openings 18 are calculated in such a way that the groove width takes the aforementioned value is memorized in the memory unit, and at the same time the shape of the groove 12 is memorized as well.

Next, as the deep opening 18 is formed by discharge machining by inserting the stick-like electrode into the mold 11 under the aforementioned discharge conditions, by carrying out such a deep opening forming operation a plurality of times along the shape of the groove 12 while shifting the stick-like electrode 17 by a predetermined pitch P in the lateral direction, a groove 12 of desired width W, depth and shape of opening portion can be formed.

As the groove 12 is formed in the mold in this manner, after inserting the insert 13 into the groove 12 of the mold, casting is performed to make a reverse model (for example, a small segment for a tire curing mold) by employing the mold 11 with the insert for a model for the casting. At this time, as the reverse model and the insert 13 integrated with each other are taken out from the mold 11, the insert embedded in the reverse model becomes a protrusion for making a tire sipe. By properly selecting the location of the deep opening 18 it is possible to form a groove 12 with a desired shape. Further, in this case, since it is sufficient for an electrode to be of simple shape, the electrode can be manufactured easily and inexpensively, and accordingly productivity is improved and also manufacturing cost is decreased. Furthermore, if the stick-like electrode 17 is worn out by repeating discharge machining, it is sufficient to replace the inexpensive electrode 17, and therefore the groove can always be formed with high accuracy. Moreover, since it is possible to change the groove width W of the groove 12 by only adjusting the pitch P between adjacent deep openings 18, it becomes possible to easily cope with any variation of thickness of the insert 13.

Figure 3:
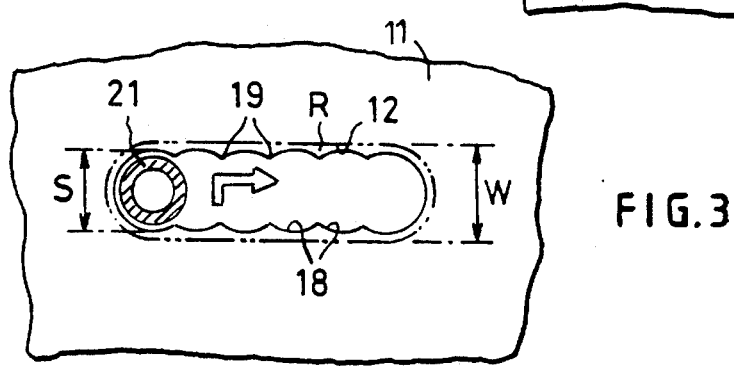
FIG. 3 is a schematic plan view in case of finishing a formed groove with higher accuracy.

Further, in case of finishing the groove 12 with the aforementioned protrusion 19, for example by elimination of the protrusion 19, or making the width or depth of the groove 12 more accurate, as shown in FIG. 3, after inserting a stick-like electrode 21 for finishing into the deep opening connected as described before, and shifting the stick-like electrode 21 successively toward the neighbouring deep opening 18 while performing discharge machining, any unnecessary portion or finishing allowance R is removed. Even while carrying out such finishing, as it is sufficient to shift the stick-like electrode leaving it inserted into the groove 12, finishing becomes more simple and efficient.

Further, in case of performing such finishing, when determining the value of the diameter D, the pitch P of the stick-like electrode and the discharge conditions, it is necessary to take the finishing allowance into consideration. Furthermore, in the case of finishing the groove as described above, it is also possible to enlarge the value of the pitch P to slightly connect the adjacent deep openings with each other. For example, when the groove width W of the groove 12 is 0.52 mm, after deep openings 18 of which the inner diameter D is 0.44 mm are formed in a mold 11 one after another by means of a stick-like electrode 17 of which the diameter is 0.40 mm, separating locations of the adjacent openings with each other to the extent of overlapping slightly, inserting a stick-like electrode 21 into any one of the deep openings 18, and shifting the electrode 21 successively toward the neighbouring deep opening 18 while performing discharge machining, finishing allowance R of which the thickness is 0.04 mm is removed by performing discharge machining two times.

Next, in case of finishing a bottom surface of the groove 12, setting the intrusion amount in the depth direction for a finishing discharge machining by 0.01 mm, and by performing the finishing discharge machining 10 times which results in carrying out finishing the bottom surface by 0.10 mm, so that a more accurate groove finish can be achieved.

Thus the finishing operation is essentially carried out as follows. After inserting the electrode into one of the deep openings, by shifting the electrode in the longitudinal direction of the groove, for example from the left edge to the right edge of the groove in FIG. 3, while keeping the electrode in the groove, one side wall of the groove is finished (by 0.04 mm). Next, by shifting the electrode from the right edge to the left edge of the groove without withdrawing the electrode, the other side wall of the groove is finished (by 0.04 mm). The allowances of the both side wall of the groove are thus removed by means of a forward and returning motion of the electrode.

In the case of finishing the bottom of the groove, by carrying out a shifting motion from one edge to the other edge of the groove 10 times while inserting the electrode toward the depth of the groove by 0.01 mm each time, without withdrawing the electrode, the bottom is finished by 0.10 min.

The finishing operation is separate from the making of the deep openings, that is the finishing is carried out only when a more accurate groove is needed.

Furthermore, although the stick-like electrode has a cylindrical shape in the aforementioned embodiment, the electrode can be of prismatic shape, for instance like a square pole. In the case of forming a deep opening 18 with circular cross-section by using said prismatic stick-like electrode, this stick-like electrode is rotated continuously around its center axis when discharge machining. Further, in the aforementioned embodiment, the depth of the groove 12 is constant, but if the depth of insertion of the stick-like electrode 17 into the mold 11 is changed depending on location in the mold, it is possible to change the depth of the groove 12 as desired depending on the location. Also, by changing the diameter D of the stick-like electrode 17 or the pitch P of the adjacent deep openings 18, it is possible to change the width W of the groove 12 as desired in accordance with the location.

Moreover, although the finishing allowance R is removed by performing discharge machining twice in the aforementioned embodiment, in accordance with the value of finishing allowance R the number of times of finishing can be changed suitably.

Further, in the same manner, with respect to the amount of finishing of the bottom surface of the groove, it is possible to obtain the desired result by changing the number of times of finishing.

As described above, by applying this invention, it is possible to form a groove with a desired shape inexpensively, easily and with high accuracy.

While the invention has been particularly shown and described with reference to certain preferred embodiments thereof, it will be understood by those skilled in the art that various changes and modifications may be made without departing from the spirit and scope of the invention.

We claim:

1. A method of forming a shape in an object by making a series of openings by means of discharge machining, comprising the steps of; carrying out discharge machining to form a first deep opening by inserting a stick-like electrode into a material, retracting the electrode from the material, shifting a location of the stick-like electrode and performing discharge machining to form a second deep opening to connect adjacent deep openings with each other, and forming a desired shape by means of repeatedly forming additional deep openings and connecting them.

2. A method as in claim 1, wherein said desired shape is a groove in said object.

3. A method as in claim 1, wherein said object is a mold and further comprising the step of inserting an insert having a shape the same as said shape formed into the thusly formed connected deep openings.

4. A method as in claim 1 further comprising the step of determining the size of said stick-line electrode as a function of the width of the deep opening to be formed.

5. A method of forming a shape in an object by means of making a series of openings by discharge machining, comprising the steps of; carrying out discharge machining to form a first deep opening by inserting a stick-like electrode into a material, retracting the electrode from the material, forming a second deep opening by discharge machining at a location of the stick-like electrode by such distance from said first deep opening to connect adjacent first and second deep openings with each other, forming a desired shape by repeatedly forming additional deep openings and connecting them and finishing the shape by shifting the stick-like electrode inserted in said connected deep openings toward a neighboring deep opening successively while performing discharge machining.

6. A method as in claim 5, wherein said shape is a groove in said object.

7. A method as in claim 5 further comprising the step of determining the size of said stick-like electrode as a function of the width of the deep opening to be formed.

8. A method as in claim 5 further comprising the step of finishing a bottom of said deep opening by successively shifting downward said stick-like electrode into said deep opening by a predetermined amount a number of times while in said deep opening to achieve a uniform bottom depth.

* * * * *